Sept. 26, 1950     M. L. TANNENBAUM     2,523,885
COMBINATION CAP AND GLAREPROOF GOGGLE
Filed Feb. 4, 1948
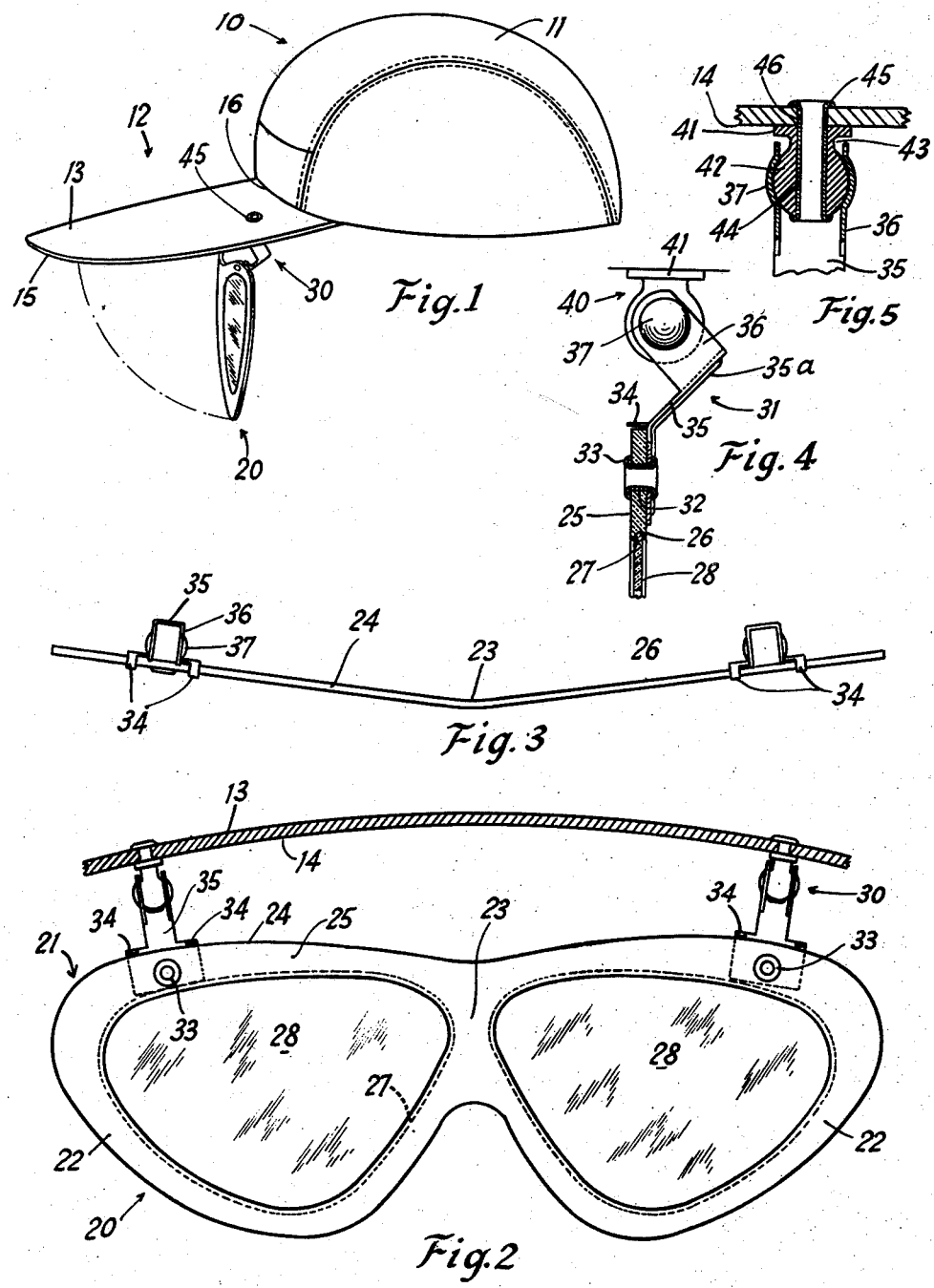
INVENTOR
Morris L. Tannenbaum
BY
ATTORNEY Patented Sept. 26, 1950

2,523,885

UNITED STATES PATENT OFFICE 2,523,885

COMBINATION CAP AND GLAREPROOF GOGGLE

Morris L. Tannenbaum, Bronx, N. Y.; Abraham J. Springer and William H. Wechter executors of said Morris L. Tannenbaum, deceased Application February 4, 1948, Serial No. 6,124

6 Claims. (Cl. 2—10)

This invention relates to a combination cap and glareproof goggle.

An object of this invention is to provide a cap including a visor with means for shading the eyes of the wearer of the cap from the sun or other glare, said means including an improved goggle universally mounted on the visor and including improved ball and socket means for hinging the goggle to the visor whereby the goggle may be moved from a position wherein the goggle is in substantial contact with the underside of the visor, when the goggle is not in use, to any one of a plurality of angular positions, wherein the goggle is adapted to shade the eyes of the wearer of said cap.

A further object of this invention is to provide a sun goggle for use with a cap wherein said goggle comprises a strong, rugged, resilient frame of plastic material formed with lens openings in which plastic lenses of glareproof material may be readily mounted, said frame being hingedly mounted on the visor of said cap by means of a pair of ball and socket hinges, wherein the socket members of said hinges are directly attached to the top edges of said frame and the ball members of said hinges are mounted on said cap visor.

Another object of this invention is to provide a cap including a visor curved from side to side and having a sun goggle movably mounted on said visor, said goggle including a frame curved from end to end to properly protect the eyes of the wearer when pivoted to a position shading the eyes of the wearer of said cap, said frame curvature also conforming substantially to the curvature of the visor so that the goggle may be moved into contact with the underside of the visor, when the goggle is not in use.

Still another object of this invention is to provide in a cap having a glareproof goggle mounted on the visor thereof, hinge means for movably mounting opposite end portions of said goggle on the visor, wherein said hinge means includes members interconnected to each other to form a ball and socket joint, whereby said goggle may be freely moved from an operative to an inoperative position relative to said visor.

Yet a further object of this invention is to provide a neat, durable, rugged, glareproof goggle and mounting in combination with a visored cap, which shall be relatively inexpensive to manufacture, comfortable to wear, attractive in appearance, and yet practical and efficient to a high degree in use.

Other objects of this invention will in part be obvious and in part hereinafter pointed out.

The invention accordingly consists in the features of construction, combination of elements, and arrangement of parts, which will be exemplified in the construction hereinafter described, and of which the scope of invention will be indicated in the following claims.

In the drawings forming a part of this invention and accompanying the same:

Fig. 1 is an elevational view of a cap having mounted thereon a glareproof goggle embodying the invention;

Fig. 2 is a front elevational view showing the goggle mounted on the visor of the cap with the goggle in its operative position;

Fig. 3 is a top plan view of the goggle showing visor mounting means attached thereto;

Fig. 4 is a side elevational view with parts in section showing the hinge elements mounted on the frame of the goggle, and Fig. 5 is a sectional view showing the interengaging hinge elements and the mounting thereof on the cap visor.

Referring in detail to the drawings, 10 designates a cap provided with the hinged glareproof goggle embodying the invention. The cap includes a crown portion 11 from which extends a stiffened, though somewhat flexible visor 12, having a top surface 13 and a bottom surface 14, a curved outer edge 15, and a curved inner edge 16, where the visor is secured to the crown portion 11.

The goggle 20 is universally mounted on the visor 12, extending from the bottom surface 14 thereof. The goggle 20 comprises a plastic frame 21 including looped portions 22 joined by a bridge portion 23. The looped portions 22 comprise a curved top edge 24 and parallel inner and outer surfaces 25, 26, respectively, extending therefrom. Each of the looped portions 22 may be formed with a V-shaped lens groove 27, in which may be positioned the individual suitably colored lenses 28, which are thinner than the frame 21 and form the glareproof protecting means. As shown in Fig. 3, the loops 22 diverge outwardly from the bridge portion 23 and are disposed in planes at an angle to each other, to allow the lens portion of the goggle 20 to assume the proper position when in use as a protective means for the eyes of the wearer of the cap.

Means is provided to suitably mount the goggle 20 on the visor 12 for universal movement thereon. To this end, a pair of ball and socket universal hinges 30 are mounted on adjacent portions of the goggle frame 21 and the cap visor. The hinges 30, each comprises a socket member 31. The socket members include a flat tab 32 which lies in contact with surface 26 of the loops 22 at the outer ends thereof, and is secured thereto by a transverse rivet or eyelet 33. A pair of projections 34 extend from the upper end of the tab 32 and transversely thereof, overlying the edge 24 of the frame 21. Extending rearwardly and upwardly from the central portion of tab 32 is a portion 35, from the sides of the upper end of which there extends forwardly and transversely thereof a pair of opposed ears 36. The portion 35 may be stiffened by a rib 35a. The ears 36 are formed with aligned and opposed cup shaped portions 37 which form a socket.

Mounted on the visor 12 adjacent inner edge 16 is a pair of ball members 40 which are adapted to be received in the sockets of the members 31. Each of the ball members 40 comprises a flat base portion 41 from which there extends a substantially spherical or ball portion 42 interconnected to the base 41 by a neck portion 43. The members 40 are formed with a through opening 44 extending from base portion 41 to the outer surface of the ball portion 42. The members 40 are mounted on the cap visor 12, with the base portion 41 of the members in contact with the surface 14 of the visor. An elongated tubular rivet or eyelet 45 extends through the opening 44 in the member 40, and a registering opening 46 in the visor 12. The opposite ends of the rivet or eyelet 45 are suitably upset, to retain the members 40 in place on the visor. The members 40 are suitably positioned on the visor to align themselves with the socket members 31 on the goggle 20.

The goggle 20 is readily mounted on the visor 12, by snapping the socket member 31 thereon on the ball portions 42 of the members 40 to frictionally engage the same. The goggle 20 is thus free to move towards or away from the surface 14 of the visor 12, even though the ball portions 42 are inclined towards each other, as shown in Fig. 2. When the goggle 20 is folded flat against the visor 12, the curvature of the goggle frame 21, as well as the angular inclination of portions 35 on hinge members 30, permits the goggle to substantially conform to the curvature of the visor. In this position, the goggle does not interfere with the normal use of the cap.

It has been found that the goggle frame 21 has substantial resiliency and strength when formed from sheet plastic stock, which may be cellulose nitrate, or other cellulose derivatives, and plastics suitable for the purpose. The entire frame 21 may be punched out of the sheet stock. The lens grooves 27 are formed in the loops 22 and the frame is curved by procedures known in the art. The individual lenses 28, preformed to shape from plastic material, such as cellulose acetate, other cellulose derivatives, or other suitable plastic materials, colored or otherwise treated to provide the same with glareproof properties, are readily snapped into place in the lens grooves 27.

The goggle 20 may be moved to any desired angular position by means of the universal mounting means 30 and retained in the desired position through the frictional engagement of the socket member 31 and the ball member 40.

It will thus be seen that there is provided a device in which the several objects of this invention are achieved and which is well adapted to meet the condition of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to protect by Letters Patent:

1. In combination, a cap including a visor having top and bottom surfaces, a glareproof goggle including a frame and lenses mounted therein on said visor, means interconnecting said goggle and said visor for movement of said goggle towards and away from the bottom surface of said visor, said interconnecting means comprising a pair of members attached to opposite ends of said frame and including socket portions and a pair of members attached to said visor and having ball portions spaced from the bottom surface of said visor, said ball portions being aligned with and frictionally engaged with the socket portions of said first mentioned members to allow movement of said goggle from a position at right angles to the visor to a position parallel to said visor, said visor being arched from side to side thereof, and said frame being preformed on an arch to complement the curvature of said visor whereby said goggle when moved toward said visor may substantially conform to the curvature of said visor.

2. In combination, a cap having a crown portion and a visor extending therefrom, said visor being curved from side to side, a goggle precurved from end to end and means for attaching said precurved goggle to the underside of said visor including a pair of universal connections between portions of the goggle on opposite sides of the center thereof, and said visor, whereby to permit rotation of said goggle relative to said visor about said universal connections from a position where the outer surface of said goggle contacts the underside of the visor to a position where the goggle is in the front of the eyes of the wearer of the cap.

3. In combination, a cap having a crown portion and a visor arched from side to side extending therefrom, a goggle precurved from end to end to complement the curvature of said visor, and means for attaching said precurved goggle to the underside of said visor including a pair of universal connections between portions of said goggle on opposite sides of the center thereof, and said visor, said connections spacing the upper edge of said goggle from the underside of said visor, whereby to permit movement of said goggle relative to said visor about said universal connections.

4. In combination, a cap having a crown portion and a visor extending therefrom, said visor being arched from side to side, a goggle precurved from end to end to complement the curvature of said arched visor and means for attaching said goggle to the underside of said visor including a pair of spaced socket members on portions of said goggle and projecting above the top edge of said goggle and a pair of spaced ball members on the underside of said visor, said members being in frictional engagement with said socket members whereby to permit movement of said goggle relative to said visor about said ball and socket members.

5. In combination, a cap having a crown and visor arched from side to side, a goggle comprising a resilient frame preformed from plastic sheet on an arch to complement the curvature of said visor, and means for attaching said goggle to the underside of said visor including a pair of socket members having portions attached to portions of said goggle frame and a pair of ball members attached to said visor and frictionally received in the sockets of said socket members, said socket members including intermediate portions inclined upwardly and rearwardly of said goggle frame whereby said goggle frame may be moved into a position contacting the underside of said visor.

6. In combination, a cap having a crown and visor arched from side to side, a goggle comprising a resilient frame preformed from plastic sheet, on an arch to complement the curvature of said visor, and means for attaching said goggle to the underside of said visor including a pair of socket members having portions attached to portions of said goggle frame and a pair of ball members attached to said visor and frictionally received in the sockets of said socket members, said visor being curved from side to side, and said ball members being inclined towards each other, the curvature of said goggle conforming to the curvature of said visor.

MORRIS L. TANNENBAUM.

REFERENCES CITED

The following references are of record in the file of this patent:

UNITED STATES PATENTS

| Number | Name | Date |
| --- | --- | --- |
| 1,313,469 | Crossley | Aug. 19, 1919 |
| 1,543,094 | Blecker et al. | June 23, 1925 |
| 1,671,342 | Cantor | May 29, 1928 |